(12) United States Patent
Nam et al.

(10) Patent No.: US 11,553,643 B2
(45) Date of Patent: Jan. 17, 2023

(54) MOBILE ROBOT AND METHOD FOR OPERATING THE SAME

(71) Applicant: LG ELECTRONICS INC., Seoul (KR)

(72) Inventors: Moon Sik Nam, Seoul (KR); Jung Sik Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 673 days.

(21) Appl. No.: 16/590,690

(22) Filed: Oct. 2, 2019

(65) Prior Publication Data
US 2020/0029496 A1    Jan. 30, 2020

(30) Foreign Application Priority Data

Sep. 4, 2019  (KR) .......................... 10-2019-0109690

(51) Int. Cl.
| | |
|---|---|
| *A01D 34/00* | (2006.01) |
| *G06N 20/00* | (2019.01) |
| *G01G 19/02* | (2006.01) |
| *G06V 20/00* | (2022.01) |

(52) U.S. Cl.
CPC ......... *A01D 34/008* (2013.01); *G01G 19/022* (2013.01); *G06N 20/00* (2019.01); *G06V 20/00* (2022.01); *G06T 2207/30261* (2013.01)

(58) Field of Classification Search
None
See application file for complete search history.

(56) References Cited

U.S. PATENT DOCUMENTS

| | | | |
|---|---|---|---|
| 9,375,842 B2* | 6/2016 | Shamlian | B25J 9/0003 |
| 11,350,564 B1* | 6/2022 | Hoyda | A01D 34/64 |
| 2010/0324731 A1* | 12/2010 | Letsky | G05D 1/0274 |
| | | | 901/1 |
| 2014/0032033 A1* | 1/2014 | Einecke | A01D 75/185 |
| | | | 701/27 |
| 2017/0269604 A1* | 9/2017 | Shiromizu | G05D 1/0088 |
| 2019/0113928 A1* | 4/2019 | Uemura | G05D 1/0088 |
| 2019/0250627 A1* | 8/2019 | Witt | G05D 1/0231 |
| 2019/0265724 A1* | 8/2019 | Sheng | A01D 75/185 |
| 2019/0357430 A1* | 11/2019 | Kraft | G05D 1/0214 |
| 2020/0050208 A1* | 2/2020 | Frick | G05D 1/027 |
| 2020/0362536 A1* | 11/2020 | Shimamura | E02F 9/2062 |
| 2021/0345545 A1* | 11/2021 | Zhao | A01D 75/185 |
| 2022/0091615 A1* | 3/2022 | Ord | G05D 1/0214 |

FOREIGN PATENT DOCUMENTS

| | | |
|---|---|---|
| KR | 10-2018-0058585 | 6/2018 |
| KR | 10-2018-0058586 | 6/2018 |

* cited by examiner

*Primary Examiner* — Ryan M Gray
(74) *Attorney, Agent, or Firm* — Ked & Associates, LLP

(57) ABSTRACT

Disclosed is a mobile robot configured to cut lawn in a work area. The mobile robot may include a main body, a weight sensing sensor, an obstacle sensing sensor, a blade, and a processor. The mobile robot may execute an artificial intelligence (AI) algorithm and/or a machine learning algorithm, and perform communication with other electronic devices in a 5G communication environment. As a result, it is possible to enhance user convenience.

14 Claims, 6 Drawing Sheets

[FIG. 1]
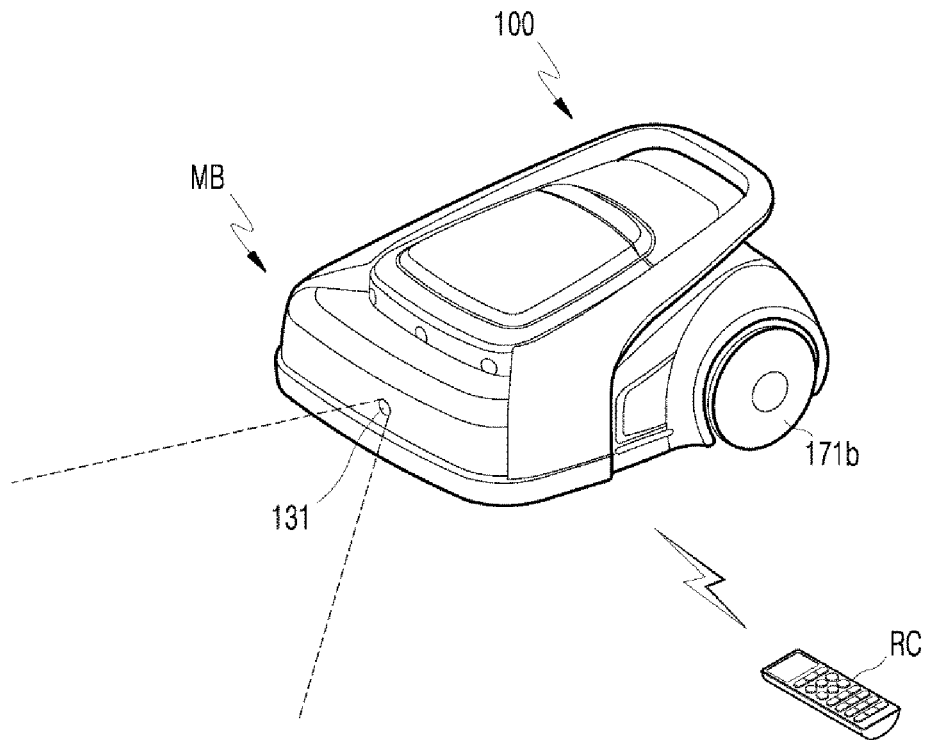
[FIG. 2]
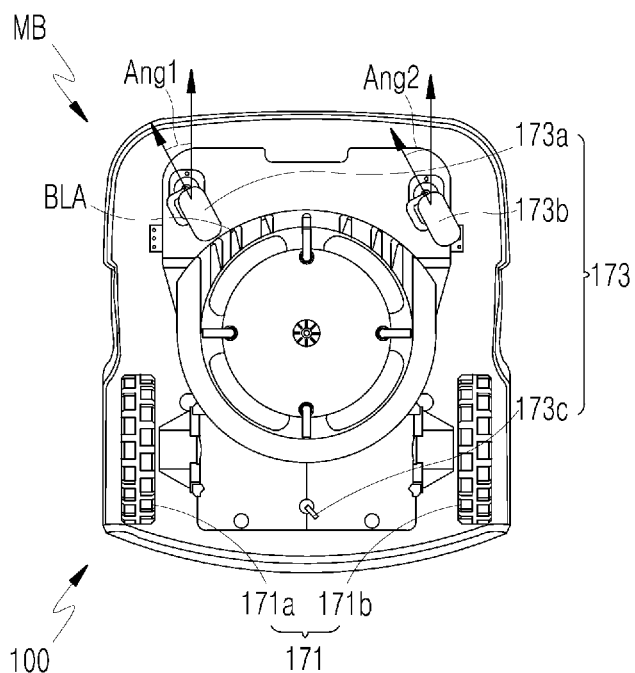

[FIG. 3]
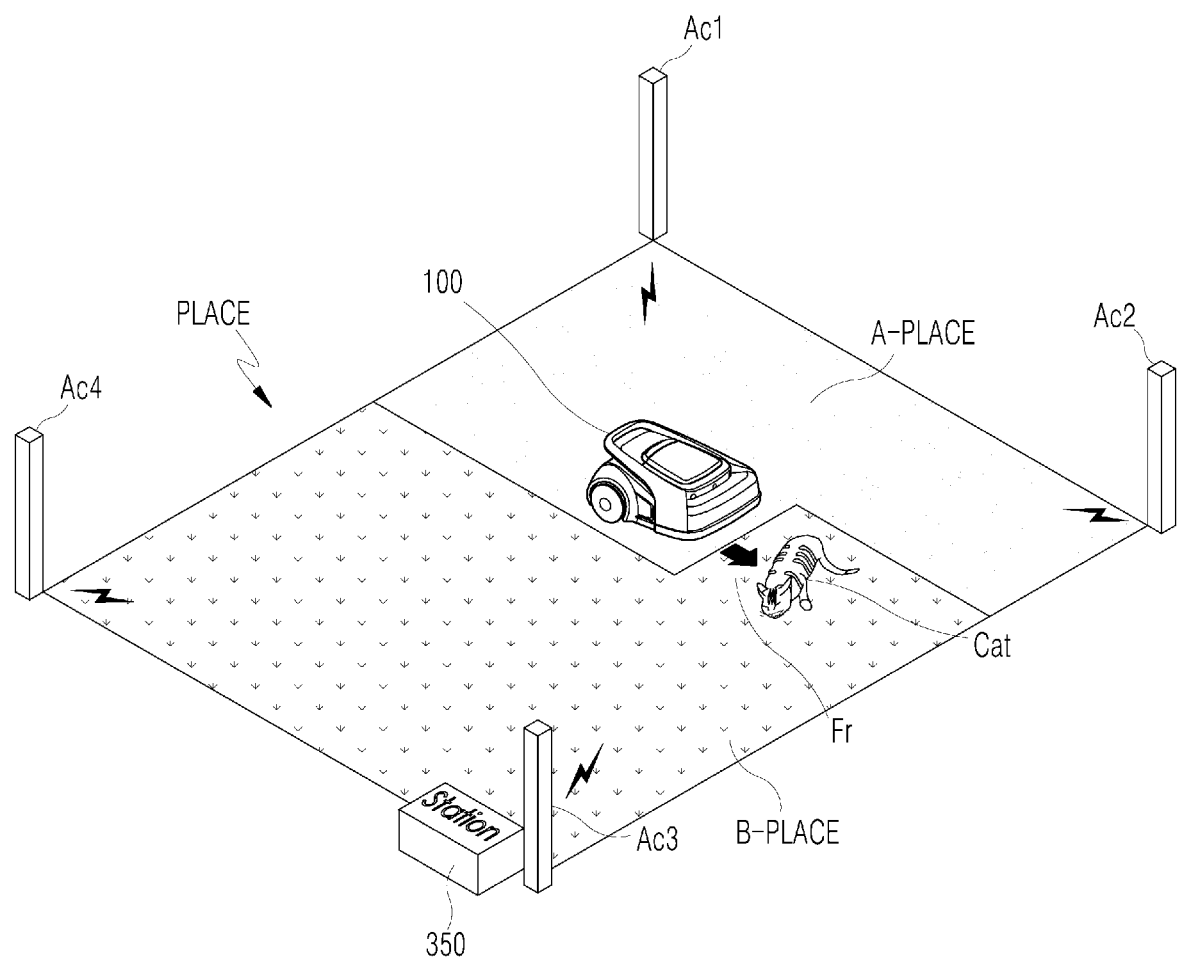

[FIG. 4]
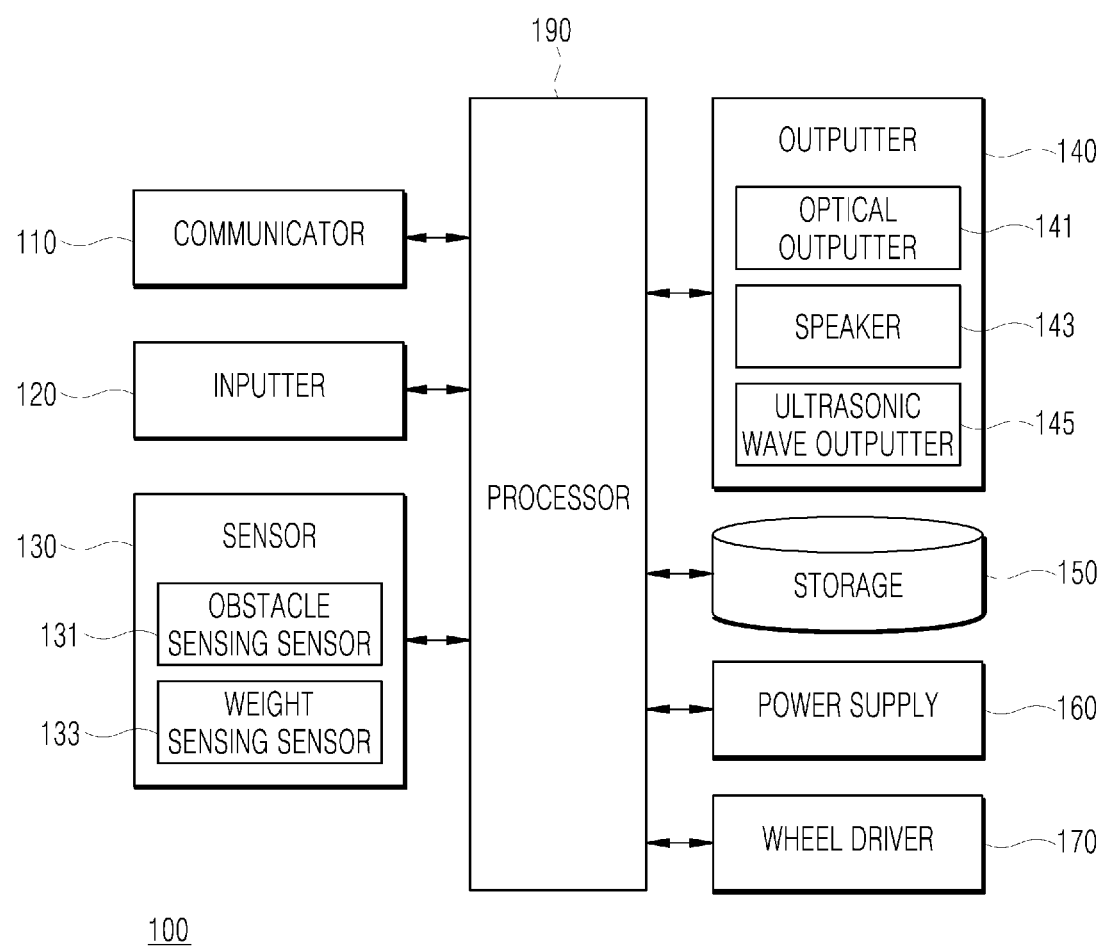

[FIG. 5]
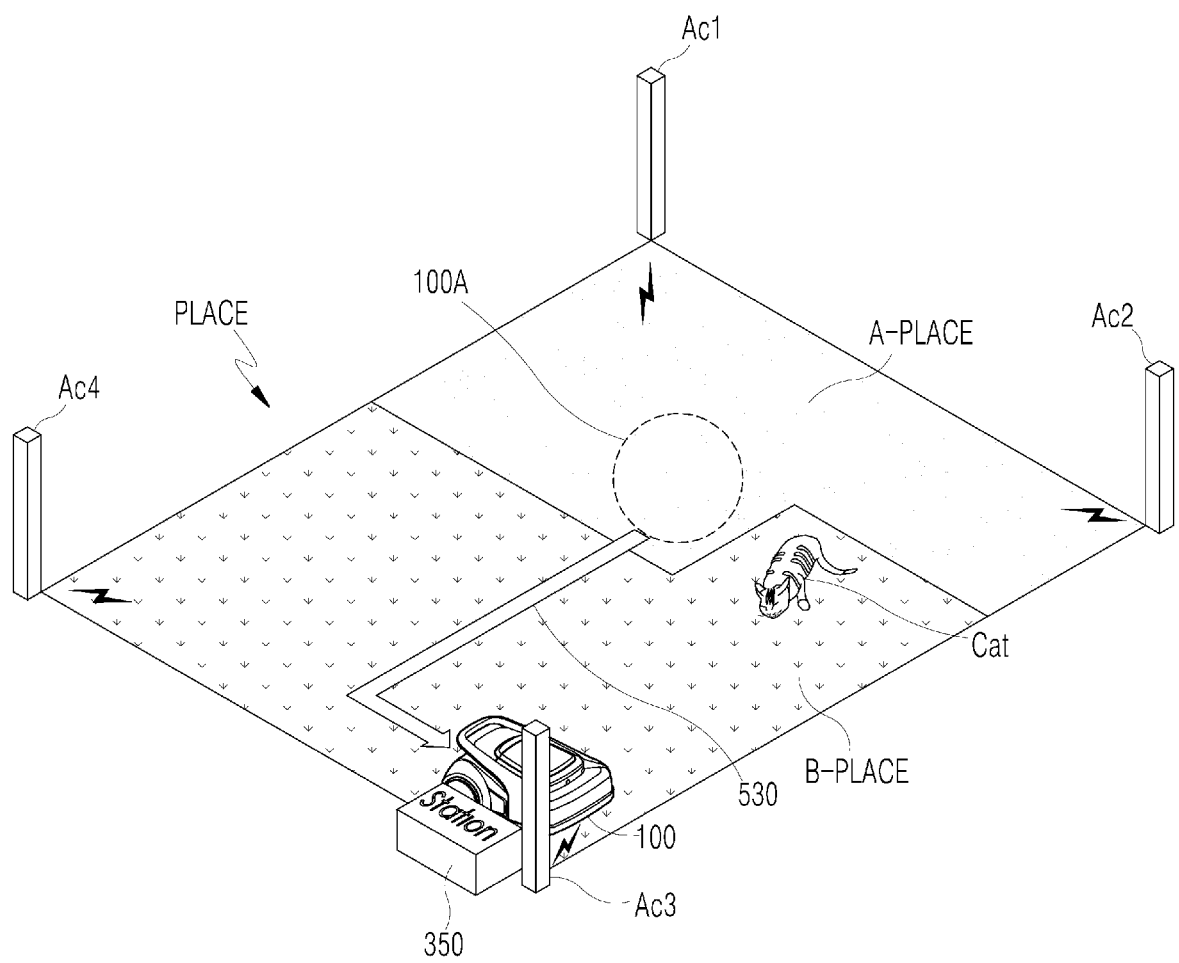

[FIG. 6]
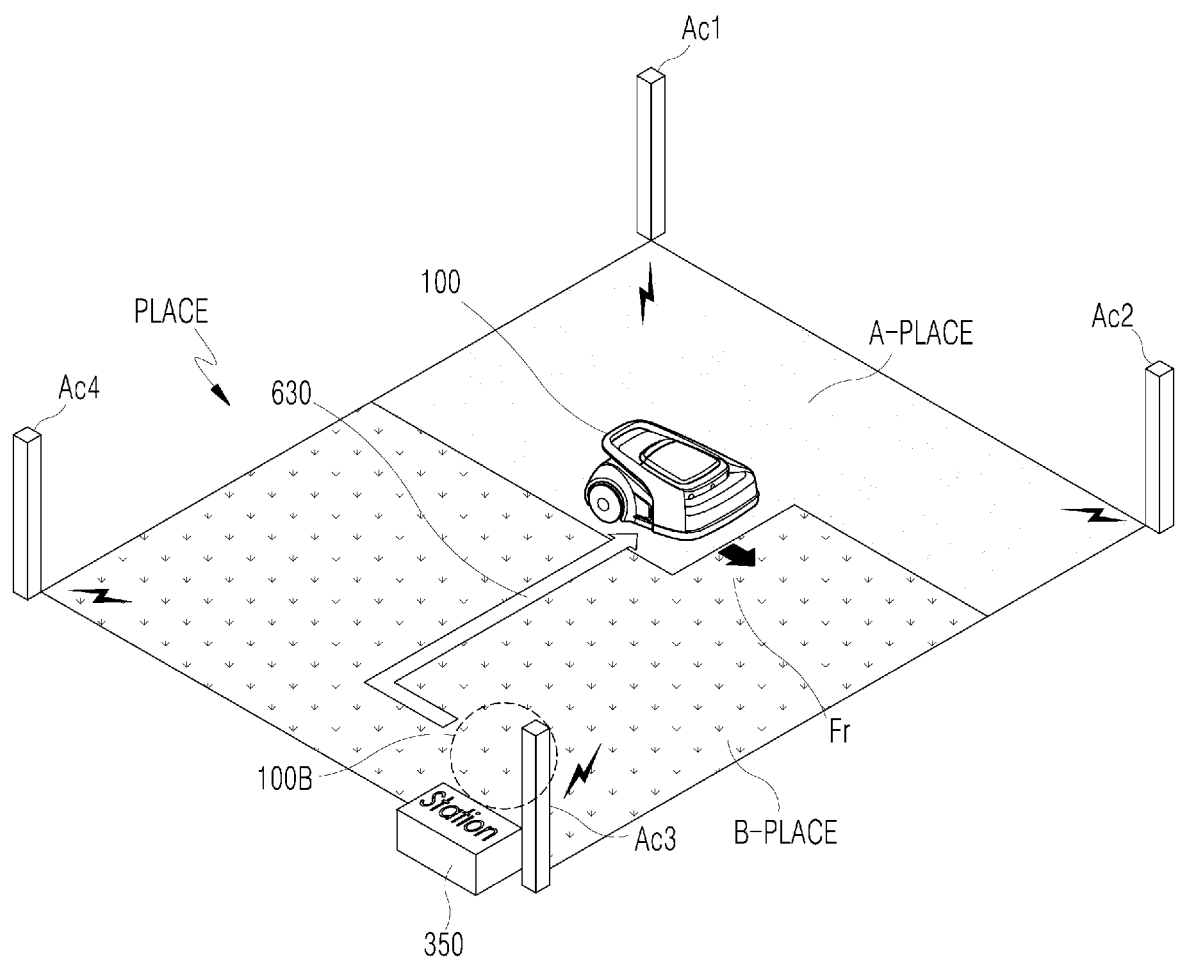

[FIG. 7]
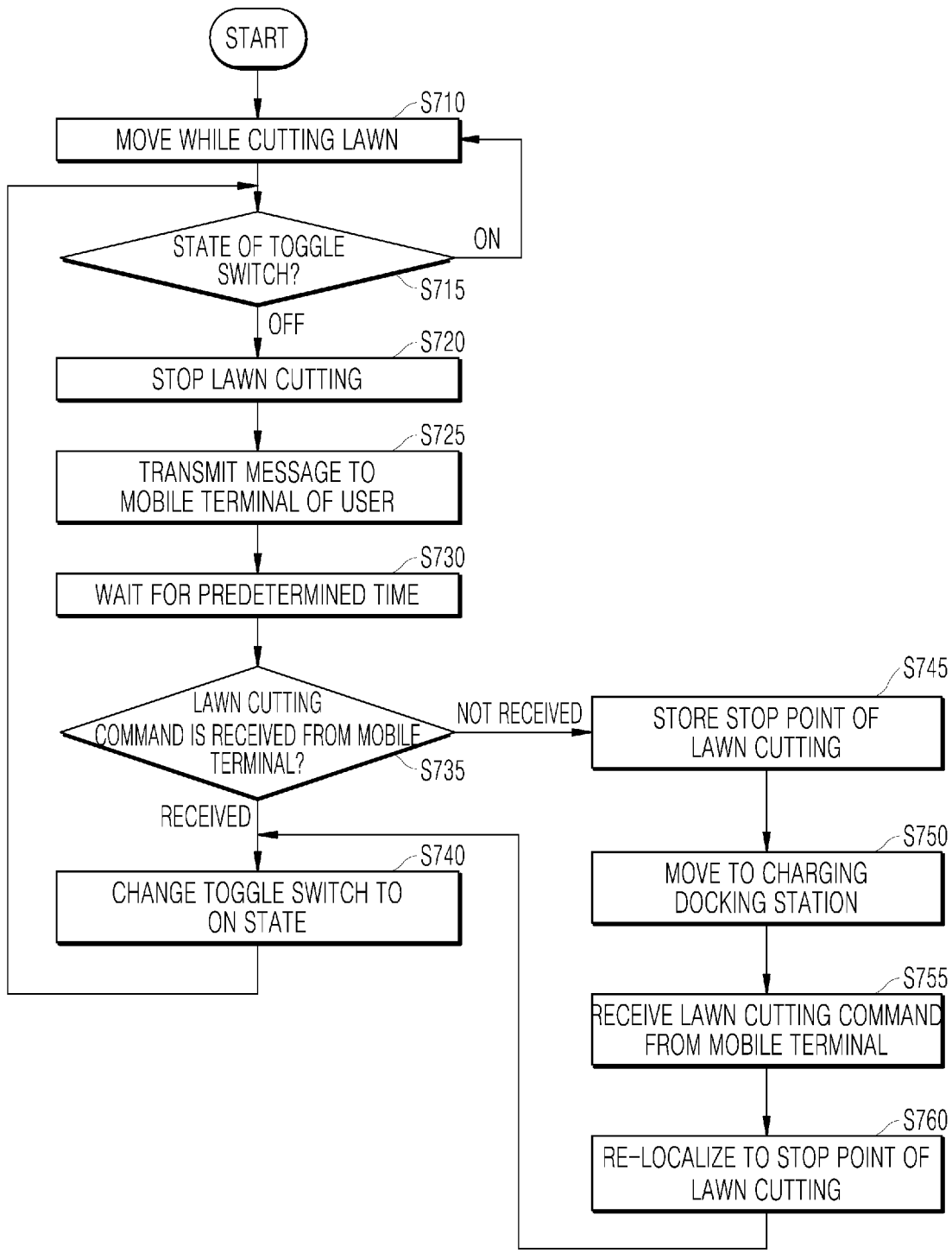

MOBILE ROBOT AND METHOD FOR OPERATING THE SAME

CROSS-REFERENCE TO RELATED APPLICATION

This present application claims benefit of priority to Korean Patent Application No. 10-2019-0109690, entitled "Mobile Robot and method for operating the same," filed on Sep. 4, 2019, in the Korean Intellectual Property Office, the entire disclosure of which is incorporated herein by reference.

BACKGROUND

1. Technical Field

The present disclosure relates to a mobile robot and a method of driving the same, and more particularly, to a mobile robot and a method of driving the same capable of cutting lawn.

2. Description of Related Art

A lawn mower is a device for trimming the lawn planted in a home garden or a playground. Such a lawn mower may be classified into a lawn mower for home used in a home, and a lawn mower for tractor used in a large playground or a farm.

The lawn mower for home includes a walk-behind type in which a person directly pulls a lawn mower from behind and mows the lawn, and a hand type in which a person directly carries by hand.

However, two types of the lawn mowers are cumbersome for people to directly operate the lawn mowers. In particular, since it is difficult for the user to mow the lawn in the yard by directly operating the lawn mower in modern busy daily life, it is mostly to hire people outside to mow the lawn, resulting in employment costs.

Accordingly, a lawn mower that is, a lawn mowing robot, has been developed that performs autonomous driving to prevent the occurrence of such additional costs and reduce the user's trouble. Various studies have been conducted to control the movement performance of the lawn mowing robot.

The lawn mower disclosed in the Related Art 1 automatically adjusts the height of the blade cutting the lawn according to the condition or terrain of the lawn. The lawn mower may be wirelessly or automatically controlled through a remote control.

The lawn mower disclosed in the Related Art 2 may obtain the position of the device and mow the lawn based on a GPS in an outdoor golf course.

However, since the lawn mowers of the Related Arts are not directly controlled by the user, it is possible to protect the user safety to some extent, but there is a limit that does not respond appropriately to the external force applied to the lawn mower or appropriately respond to an obstacle.

RELATED ART DOCUMENTS

Patent Documents

Related Art 1: Korean Patent Laid-Open Publication No. 10-2018-0058586 (published date: Jun. 1, 2018)

Related Art 2: Korean Patent Laid-Open Publication No. 10-2018-0058585 (published date: Jun. 1, 2018)

SUMMARY OF THE DISCLOSURE

An object of the present disclosure is to provide a method for accurately specifying the position of a mobile robot having a lawn cutting function regardless of an indoor or an outdoor.

Another object of the present disclosure is to provide a mobile robot and a method of driving the same, which sense an external force or sense an obstacle located in a movement direction.

Still another object of the present disclosure is to provide a mobile robot and a method of driving the same, which provide notification information to a user terminal registered in advance, when an event occurs and the mobile robot stops mowing the lawn.

Aspects of the present disclosure are not limited to the above-mentioned aspects, and other technical aspects not mentioned above will be clearly understood by those skilled in the art from the following description.

For achieving the objects, a mobile robot according to an embodiment of the present disclosure may include a main body, a weight sensing sensor configured to sense an external force applied to the main body, an obstacle sensing sensor configured to sense an obstacle approaching in a predetermined range, a blade disposed on a lower portion of the main body, and a processor configured to stop driving of the blade by setting a toggle switch to an OFF state, when sensing an external force exceeding a predetermined intensity through the weight sensing sensor or sensing the obstacle in the predetermined range through the obstacle sensing sensor, in the middle of moving while driving the blade, and to stop the movement of the mobile robot.

A method of driving a mobile robot according to an embodiment of the present disclosure may include moving while cutting lawn by using a blade, stopping the lawn cutting by setting a toggle switch to an OFF state, when sensing an external force exceeding a predetermined intensity or sensing an obstacle disposed in a predetermined range, and stopping movement.

In addition, the driving method may further include receiving a wireless signal transmitted from three or more wireless communication anchors disposed in a work area of a mobile robot through the three or more AOA antennas and specifying the position of the mobile robot on the work area based on the incident angle of the wireless signal.

In addition, the driving method may further include storing information on a stop point of the lawn cutting and moving to a charging docking station disposed in a predetermined area of the work area.

Furthermore, the driving method may further include docking to the charging docking station and charging power of the mobile robot.

According to various embodiments of the present disclosure, it is possible to specify the position of the mobile robot that mows the lawn regardless of an indoor or an outdoor, to protect the safety of an infant and an animal that regard the mobile robot as a toy and approach while mowing the lawn, and to enhance user convenience because the mobile robot performs autonomous driving.

BRIEF DESCRIPTION OF THE DRAWINGS

FIGS. 1 and 2 are diagrams for explaining the appearance of a mobile robot that performs a lawn mowing function according to an embodiment of the present disclosure.

FIG. 3 is a diagram for schematically explaining the driving of a mobile robot according to an embodiment of the present disclosure.

FIG. 4 is a block diagram illustrating a mobile robot according to an embodiment of the present disclosure.

FIGS. 5 and 6 are diagrams for explaining a method of driving a mobile robot sequentially when an obstacle has been sensed according to an embodiment of the present disclosure.

FIG. 7 is a sequence diagram illustrating a method of driving a mobile robot according to an embodiment of the present disclosure.

DETAILED DESCRIPTION

Since various embodiments of the present disclosure may use a technology related to artificial intelligence, artificial intelligence will be schematically described below.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Hereinafter, exemplary embodiments disclosed herein will be described in detail with reference to the accompanying drawings, and like reference numerals designate like elements, and redundant description thereof will be omitted. Wherever possible, the same reference numbers will be used throughout the drawings to refer to the same or like parts. In the following description, known functions or structures, which may confuse the substance of the present disclosure, are not explained.

FIGS. 1 and 2 are diagrams for explaining the appearance of a mobile robot 100 that performs a lawn mowing function according to an embodiment of the present disclosure. FIG. 1 is a perspective diagram of the mobile robot 100, and refers to the numeral references of FIG. 2 together.

The mobile robot 100 may include a main body (MB), a plurality of wheels 171 configured to move the main body (MB), and a blade (BLA) that is a tool of mowing the lawn. The mobile robot 100 may manage an area of 3000 square meters or more, may be driven in a global pattern type, and may move at a speed of 50 cm or more per second, but an embodiment is not limited thereto. The mobile robot 100 may be controlled by a remote control (RC).

The mobile robot 100 may include an obstacle sensing sensor 131 to sense an obstacle approaching the mobile robot 100 by a predetermined distance. In addition, the mobile robot 100 may include a weight sensing sensor (133 in FIG. 4) to sense an external force applied to the main body (MB). The mobile robot 100 may stop the lawn mowing and stop the movement when there is an obstacle in the movement direction or when an external force of a predetermined intensity or more is applied to the main body (MB).

The obstacle sensing sensor (131 in FIG. 4) may include a laser-based Optical Fiber Sensor (OFS), and the OFS may be used to sense an obstacle of about 20 meters in a straight-line direction, but may irradiate light toward the ground, such that the measurement distance may be shortened. In addition, a plurality of OFSs (for example, four, eight, or the like) may be mounted on the mobile robot 100.

The mobile robot 100 may perform a lawn mowing work by using the blade (BLA) according to the state of a Toggle Switch. Specifically, the mobile robot 100 may mow the lawn by driving the blade (BLA) when the toggle switch is in an ON state, and may stop the driving of the blade (BLA) when the toggle switch is in an OFF state. Here, the toggle switch may be implemented in hardware, but implemented in software in an optional embodiment.

FIG. 2 is a bottom diagram of the mobile robot 100 according to an embodiment of the present disclosure.

The mobile robot 100 may include the blade (BLA) for mowing the lawn on the lower portion (particularly, the lower center area) of the main body (MB), and the blade (BLA) is not exposed to the outside of the main body (MB). Accordingly, it is possible to ensure the safety of the living organisms disposed around the mobile robot 100, and also to prevent damage to the blade (BLA). In addition, the blade (BLA) may be implemented as a safety blade.

The mobile robot 100 may move by including a plurality of driving wheels 171a, 171b, (171), and may change directions by including a plurality of caster wheels 173a to 173c (173). The switching angle may be set according to the front direction of the mobile robot 100 and the angles (Ang1, Ang2) of the caster wheel 173.

The mobile robot 100 may control the driving wheel 171 through the wheel driver (170 in FIG. 4). Specifically, the mobile robot 100 may control the wheel driver 170 so that the directions of the first caster wheel 173a and the second caster wheel 173b are changed. Here, the third caster wheel 173c may be passively rotated according to the movement direction of the mobile robot 100.

FIG. 3 is a diagram for schematically explaining the driving of the mobile robot 100 according to an embodiment of the present disclosure.

The mobile robot 100 may be disposed on a so-called lawn, and the lawn may be referred to as a work area (PLACE) of the mobile robot 100, and may be disposed regardless of an indoor or an outdoor. The work area (PLACE) may have a rectangular shape, but in optional embodiments, the work area (PLACE) may be implemented in various forms. The work area (PLACE) may include a first work area (A-PLACE) in which the lawn mowing has been already completed and a second work area (B-PLACE) in which the lawn mowing is to be performed.

A plurality of wireless communication anchors (AC1 to AC4) may be disposed at each side of the work area (PLACE), respectively. The plurality of wireless communication anchors (AC1 to AC4) may be devices that support Ultra Wide Band (UWB) communication, and may perform communication with wide bandwidth at low power. At this time, the mobile robot 100 may receive wireless signals of the plurality of wireless communication anchors (AC1 to AC4), and transmit wireless signals to the wireless communication anchors (AC1 to AC4).

The mobile robot 100 may include multi-antenna having three or more Angle Of Arrival (AOA) antennas therein. The AOA antennas are disposed at predetermined intervals, and the interval information of the AOA antennas may be stored in a storage 150 to be described later. The multi-antenna may also perform the UWB communication.

The mobile robot 100 may specify the position of the mobile robot on the work area (PLACE) based on an incident angle of the wireless signal when the wireless signal (the signal triggered by the wireless communication anchor) is received through each of the AOA antennas. Accordingly, when the mobile robot 100 travels the work area (PLACE) several times (or, once), a spatial map of the work area (PLACE) and the position of the mobile robot 100 on the spatial map may be specified based on a Simultaneous Localization And Mapping (SLAM) algorithm.

When the obstacle is sensed while generating the spatial map corresponding to the work area (PLACE), the mobile robot 100 may store at least one of position information on which the obstacle has been sensed, sensing range information by the obstacle sensing sensor 131, or the position information of the mobile robot as temporary node information, and then reflect it on the spatial map. That is, the temporary node information may be updated on the spatial map. Accordingly, while generating the spatial map corresponding to the work area (PLACE), information on the sensed obstacle and the sensing range of the obstacle sensing sensor 131 that senses the obstacle may be reflected on the spatial map.

As described above, the mobile robot 100 may measure the position by using triangulation method. Specifically, the mobile robot 100 may measure the direction of the wireless signal triggered by the wireless communication anchors (AC1 to AC4) disposed at a plurality of fixed points, and the mobile robot 100 may specify the position of the mobile robot 100 in the work area (PLACE). Accordingly, the position of the mobile robot 100 may be measured not only an outdoor but also an indoor by not measuring the position in a method of using a satellite (for example, GPS).

The mobile robot 100 may perform the lawn mowing work in the front direction (Fr). The mobile robot 100 may set the internal toggle switch to an ON state to drive the blade (BLA).

In this case, when the mobile robot 100 senses an obstacle (Cat) in the sensing range, the mobile robot 100 may stop the driving of the blade (BLA) by changing the toggle switch to an OFF state, and stop the movement.

Meanwhile, a charging docking station 350 may be disposed in one area of the work area (PLACE). A battery of the mobile robot 100 may be charged from the charging docking station 350.

FIG. 4 is a block diagram illustrating a configuration of a mobile robot 100 according to an embodiment of the present disclosure.

Referring to FIG. 4, the mobile robot 100 may include a communicator 110, an inputter 120, a sensor 130, an outputter 140, a storage 150, a power supply 160, a wheel driver 170, and a processor 190. The components illustrated in FIG. 4 are not essential to implement the mobile robot 100, such that the mobile robot 100 described herein may have more or fewer components than those listed above.

The communicator 110 may communicate with the remote control (RC in FIG. 1), the wireless communication anchor (AC1 to AC4 in FIG. 3) disposed in the work area, an external mobile terminal, and an external information providing system by using a wired or wireless communication technology.

In a selective embodiment, the communicator 110 may use the communication technology, such as Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

The communicator 110 may receive the wireless signal triggered by the wireless communication anchors (AC1 to AC4), and the position of the mobile robot 100 on the work area (PLACE) may be specified based on the incident angle of the received wireless signal. The spatial map corresponding to the work area (PLACE) may be generated based on the present method.

The communicator 110 may include the multi-antenna having three or more Angle Of Arrival (AOA) antennas, and generate the spatial map corresponding to the work area (PLACE) based on the information on the incident angle of the wireless signal, the distance information between the AOA antennas, and the position information of the wireless communication anchors (AC1 to AC4). In some implementations, communicator 110 may be implemented a transceiver. The transceiver may be configured to receive the wireless signal and configured to transmit the wireless signal.

The inputter 120 may include a user inputter configured to receive information from a user. In optional embodiments, the inputter 120 may include a camera for inputting an image signal, and a microphone for receiving an audio signal. Here, the signal obtained from the camera or the microphone may also be referred to as sensing data or sensor information by treating the camera or the microphone as a sensor. In some implementations, the inputter 120 may be implemented input interface.

The inputter 120 may obtain input data to be used when acquiring an output using training data and a learning model for model training. The inputter 120 may obtain raw input data, and in this case, the processor 190 may extract input features as a preprocessing operation on the input data. The inputter 120 may receive real time position information of the mobile robot 100 on the work area (PLACE), real time tilt information of the work area (PLACE) of the sensor 130 to be described later (for example, collected from a gyro sensor, an acceleration sensor, and the like), and the like.

The sensor 130 may obtain at least one of internal information of the mobile robot 100, surrounding environment information of the mobile robot 100, or user information by using various sensors.

At this time, the sensor 130 may include the obstacle sensing sensor 131, the weight sensing sensor 133, an illuminance sensor, an acceleration sensor, a magnetic sensor, a gyro sensor, an inertial sensor, an RGB sensor, an IR sensor, a fingerprint sensor, an ultrasonic wave sensor, an optical sensor, a microphone, a lidar, a radar, and the like.

Here, the obstacle sensing sensor 131 may sense an obstacle approaching the mobile robot 100 within a predetermined range. The obstacle sensing sensor 131 may be implemented as an OSF sensor, an OFS sensor, a PIR sensor, a proximity sensor, an optical sensor (for example, a laser sensor disposed at a plurality of points of the mobile robot 100), and the like, and may sense an obstacle disposed within a predetermined distance from the mobile robot 100.

In addition, the weight sensing sensor 133 may sense an external force applied to the main body (MB). When the intensity of the external force sensed by the weight sensing sensor 133 exceeds a predetermined intensity, the processor 190 may allow the mobile robot 100 to perform driving corresponding thereto.

The outputter 140 may generate an output related to visual, auditory, or tactile senses, or the like, and the outputter 140 may include an optical outputter 141 configured to output visual information, a display, and the like, may include a speaker 143 configured to output auditory information, an ultrasonic wave outputter 145 configured to output an ultrasonic wave signal belonging to an inaudible frequency, and the like, and may include a haptic module configured to output tactile information. In some implementations, the outputter 140 may be implemented an output interface. In some implementations, the output interface may be configured to output at least one of laser light, an ultrasonic wave signal, or a warning sound toward the obstacle.

The storage 150 may store data to support various functions of the mobile robot 100. The storage 150 may store a plurality of application programs (or applications) to be driven by the mobile robot 100, data for operating the mobile robot 100, and commands.

In addition, the storage 150 may store information necessary to perform an operation using artificial intelligence, machine learning, and an artificial neural network. The storage 150 may store the deep neural network model. The deep neural network model may be used to infer a result value with respect to new input data rather than learning data, and the inferred value may be used as a basis for a determination to perform an operation.

A power supply 160 receives power from an external power source and an internal power source under the control of the processor 190 to thereby supply power to each component of the mobile robot 100. The power supply 160 includes a battery, and the battery may be a built-in battery or a replaceable battery. The battery may be implemented as an embedded battery or a replaceable battery, and may be chargeable using a wired or wireless charging method. Here, the wireless charging method may include a magnetic induction method or a magnetic resonance method.

The wheel driver 170 may mainly control the driving wheel (171 of FIG. 2) to move the mobile robot 100, and in an optional embodiment, the wheel driver 170 may control the caster wheel 173 to turn the direction of the mobile robot 100.

The processor 190 is a module that controls the components of the mobile robot 100. Here, the processor 190 may represent, for example, a hardware-embedded data processing device having a physically structured circuit to execute functions expressed as instructions or codes included in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

Hereinafter, the processing of the processor 190 will be mainly described.

The processor 190 may move the mobile robot 100. The processor 190 may control the wheel driver 170 to move to a desired position and direction.

The processor 190 may decide whether to perform the lawn mowing by using the toggle switch. The processor 190 may cut the lawn by using the blade (BLA) when the toggle switch is set to the ON state, and when the toggle switch is set to the OFF state, the processor 190 may stop the driving of the blade (BLA). When the toggle switch is set to the OFF state, the processor 190 may stop the movement of the mobile robot 100.

The processor 190 may sense an external force through the weight sensing sensor 133 while moving and cutting the lawn by using the blade (BLA). When the sensed intensity of the external force exceeds a predetermined intensity, the processor 190 may stop the driving of the blade (BLA) by setting the toggle switch to the OFF state.

Specifically, if the impact occurs on the main body (MB) when the infant or the animal jumps on the upper portion of the mobile robot 100, the processor 190 may stop performing the lawn mowing work. At this time, when the external force continues to be applied even after a predetermined time has elapsed, the processor 190 may generate a specific noise through the speaker 143 to provide a notification to the subject applying the external force, or to apply the vibration to the subject through the haptic module.

In addition, when sensing an obstacle within a predetermined range through the obstacle sensing sensor 131, the processor 190 may stop cutting the lawn by setting the toggle switch to the OFF state.

At this time, when the obstacle is sensed even after a predetermined time has elapsed, the processor 190 may decide the obstacle as a static obstacle and control the wheel driver 170 to avoid the obstacle. In an optional embodiment, the processor 190 may directly do homing to the charging docking station 350 or transmit a notification on stopping the lawn cutting to an external user terminal.

In addition, the processor 190 may output at least one of a laser light, an ultrasonic wave signal, or a warning sound toward the obstacle through the outputter 140 so that the obstacle moves as soon as the obstacle is sensed. In the case of a dynamic obstacle, the obstacle may move by the above measures.

If the obstacle does not move, the processor 190 may decide the obstacle as a fixed obstacle, and update the corresponding point as the fixed obstacle on the spatial map corresponding to the work area (PLACE).

As described above, the processor 190 may measure the angle of the wireless signal incident on each of the AOA antennas by using each of the AOA antennas that sense three or more directions of the wireless signals triggered by the three or more wireless communication anchors (AC1 to AC4).

The processor 190 may measure the position of the mobile robot 100 on the work area (PLACE) based on the incident angle, the distance information between the AOA antennas, the phase information, and the position information of the wireless communication anchors (AC1 to AC4). According to an embodiment, a Time Difference of Arrival (TDoA) method may also be applied.

The processor 190 may specify the position of the mobile robot 100 in the work area (PLACE) based on the information received through the communicator 110. In addition, the processor 190 may generate the spatial map corresponding to the work area (PLACE), and update the position information of the obstacle on the spatial map based on the specified position information of the mobile robot 100 and the sensing range of the obstacle sensing sensor 131.

The processor 190 may generate the spatial map corresponding to the work area (PLACE) based on the measured position information of the mobile robot 100.

In this case, the processor 190 may sense an event that may stop cutting the lawn while generating the spatial map or after generating the spatial map by using the obstacle sensing sensor 131 and the weight sensing sensor 133.

When generating a map based on the SLAM algorithm, the processor 190 may generate a map while connecting node information. The node information may include position based feature information for synchronizing a position with a map.

When the obstacle is sensed within the sensing range of the obstacle sensing sensor 131 and the toggle switch is changed to the OFF state while the spatial map corresponding to the work area (PLACE) is generated, the processor 190 may store the temporary node information including at least one of the position information of the mobile robot 100, the sensing range information of the obstacle sensing sensor 131, or the position information of the sensed obstacle in the storage 150.

That is, the processor 190 may reflect the obstacle sensing range of the obstacle sensing sensor 131 on the spatial map while generating the spatial map corresponding to the work area (PLACE) in real time.

After the spatial map corresponding to the work area (PLACE) has been generated, the processor 190 may apply the temporary node information on the generated spatial map to reflect the obstacle occurrence information on the spatial map.

In addition, if the obstacle is sensed through the obstacle sensing sensor 131 when the spatial map corresponding to the work area (PLACE) has been generated, the processor 190 may apply at least one of the position information of the mobile robot 100, the sensing range information of the obstacle sensing sensor 131, or the position information of the sensed obstacle on the generated spatial map. That is, when the spatial map corresponding to the work area (PLACE) has been completed, the processor 190 may reflect the obstacle sensing range of the obstacle sensing sensor 131 to the spatial map.

The processor 190 may compare the feature information with respect to the work area based on the event information collected while the spatial map is generated and the event information collected after the spatial map has been generated. When the obstacle position information generated during the generation of the spatial map and the obstacle position information generated after the generation of the spatial map are the same, the processor 190 may decide the point information where the obstacle has been generated as the fixed obstacle point.

When the external force is applied to the main body (MB) or an obstacle is sensed within a predetermined range, the mobile robot 100 may move out of the corresponding position, and in an optional embodiment, the mobile robot 100 may also wait for a predetermined time at the corresponding position.

According to an embodiment, when the toggle switch is turned off, the mobile robot 100 may store the information on the stop point of the lawn cutting in the storage 150, and directly do homing to the charging docking station 350 disposed in a predetermined area of the work area (PLACE).

When the mobile robot 100 has been docked to the charging docking station 350, the processor 190 may charge the power of the power supply 160, and request the charging docking station so that a message about stopping the lawn cutting is transmitted to the mobile terminal through the communicator provided in the charging docking station 350. If the mobile robot 100 does not have a mobile communication module, the method may be one method capable of notifying a work suspension.

The user possessing the mobile terminal may be a user who manages the lawn mowing work, and when the user confirms the work area (PLACE), and then determines that the problem has been solved, the user may allow the mobile robot 100 to resume the lawn mowing work.

When receiving a command to perform the lawn cutting from the mobile terminal through the charging docking station 350, the processor 190 may move the mobile robot 100 to the stop point of the lawn cutting stored in the storage 150, and control the blade (BLA) by changing the toggle switch to the ON state to perform the lawn cutting.

According to an embodiment, the processor 190 may transmit the message about stopping of the lawn cutting to the mobile terminal through the communicator 110 without immediately leaving the position where the toggle switch has been turned off. That is, when including the mobile communication module, the processor 190 may immediately notify the mobile terminal that the lawn mowing work has been stopped.

At this time, when receiving a command to perform the lawn cutting from the mobile terminal through the communicator 110, the processor 190 may control the blade (BLA) by changing the toggle switch to the ON state to perform the lawn cutting.

According to an embodiment, when the external force applied to the main body (MB) by exceeding a predetermined intensity is resolved, the processor 190 may control the blade (BLA) by changing the toggle switch to the ON state to perform the lawn cutting.

According to an embodiment, when an obstacle is sensed through the obstacle sensing sensor 131, the processor 190 may reset the movement route of the mobile robot 100 to the direction different from the direction in which the obstacle has been disposed, and control the blade (BLA) by changing the toggle switch to the ON state to perform the lawn cutting along the reset movement route.

That is, the processor 190 may not move directly to the charging docking station 350, may not provide the mobile terminal with the notification about stopping the work, and may immediately perform the lawn mowing work by avoiding the place where the obstacle has appeared.

The processor 190 may synchronize the positions of the work area (PLACE) and the mobile robot 100 by using the information about a point at which the mobile robot 100 moves. That is, the processor 190 may perform the Simultaneous Localization And Mapping for the work area (PLACE) and the position information of the mobile robot 100 on the work area (PLACE).

The processor 190 may include a learning processor for performing artificial intelligence computation or itself include a learning processor. The processor 190 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation.

In this case, the processor 190 may be implemented to perform artificial intelligence processing together with a learning processor of an artificial intelligence server (for example, the information providing system).

The storage 150 may store information necessary to perform an operation using artificial intelligence, machine learning, and an artificial neural network. The storage 150 may store the trigger recognition model. The deep neural network model may be used to infer a result value with respect to new input data rather than learning data, and the inferred value may be used as a basis for a determination to perform an operation.

The processor 190 may learn the deep neural network model. Specifically, the processor 190 may use, as an input data, lawn mowing start time information/position information of the mobile robot 100, lawn mowing finish time information/position information, real time movement information of the mobile robot 100 according to a flow of time, movement pattern information of the mobile robot 100, tilt information of the ground collected by the mobile robot 100, the number of turn direction times and angle information of the mobile robot 100, battery consumption information, and the like in the deep neural network model.

In addition, the processor 190 may set output data of the deep neural network model as lawn cutting reliability information. The lawn cutting reliability information may be set so that the lawn is actually cut evenly, and a high value is produced in a job that takes less time.

The processor 190 may input a ground truss (a set of input data and output data) through actual training to generate the deep neural network model and verify accuracy.

When the deep neural network model is not used, the processor 190 may store a case where a minimum time has been taken for each movement of the mobile robot 100 and the lawn cutting has been made evenly in the storage 150 as the recommended movement pattern.

In addition, the processor 190 may partially perform without cutting the entire work area (PLACE), and also cut only a predetermined partial area based on the inclination of the work area (PLACE), weather information, and the like, but an embodiment is not limited thereto.

FIGS. 5 and 6 are diagrams for explaining the driving of the mobile robot 100 sequentially, when sensing an obstacle according to an embodiment of the present disclosure.

FIG. 5 illustrates the driving of the mobile robot 100 when the obstacle (Cat) has been sensed while the mobile robot 100 performs the lawn mowing work in FIG. 3.

The mobile robot 100 may set the toggle switch to the OFF state to stop the lawn mowing work, and avoid the obstacle (Cat) to move to the charging docking station 350. That is, the mobile robot 100 may move to the charging docking station 350 along the movement route 530 beyond a position 100A where the obstacle (Cat) has been sensed.

FIG. 6 is a diagram for explaining the driving of the mobile robot 100 when receiving a lawn cutting command from the mobile terminal.

The mobile robot 100 may receive a work resuming command of the mobile terminal to move to the position 100A where the obstacle (Cat) has been sensed. That is, the mobile robot 100 may move along the movement route 630 from the point 100B where the charging docking station 350 has been disposed to the point where the toggle switch has been set to the OFF state.

FIG. 7 is a sequence diagram illustrating a method of driving the mobile robot 100 according to an embodiment of the present disclosure.

First, the mobile robot 100 moves while cutting lawn (operation S710).

The cutting start command may be performed through the mobile terminal or the remote control (RC).

In an optional embodiment, when a SLAM command of the remote control (RC) is input, the map corresponding to the work area (PLACE) and the position information of the mobile robot 100 on the map may also be specified while traveling the work area (PLACE) before cutting the lawn. The mobile robot 100 may generate a spatial map corresponding to the work area (PLACE) in real time based on the incident angle of the wireless signal received through the communicator 110.

The mobile robot 100 monitors a toggle switch state (operation S715), and when the toggle switch is in the ON state, the mobile robot 100 continues to perform the lawn cutting.

If the toggle switch of the mobile robot 100 is in the OFF state, the lawn cutting is stopped (operation S720).

That is, the mobile robot 100 may set the toggle switch to the OFF state when an event to stop the lawn mowing work occurs. For example, the mobile robot 100 may change the toggle switch to the OFF state for stopping the operation of the blade (BLA) when sensing an obstacle or sensing an external force of a predetermined intensity or more applied to the main body (MB).

The mobile robot 100 transmits a message to the mobile terminal of the user (operation S725). The message may include information indicating that the lawn mowing work may not be performed because the toggle switch is in the OFF state.

When waiting for a predetermined time (operation S730) and receiving a lawn cutting command from the mobile terminal (operation S735), the mobile robot 100 may change the toggle switch to the ON state (operation S740) to continue to perform the lawn mowing work.

If the mobile robot 100 does not receive the lawn cutting command from the mobile terminal (operation S735), the mobile robot 100 may store the stop point information of the lawn cutting in the storage 150 (operation S745), and move to the charging docking station 350 (operation S750).

When having already constituted all the SLAM maps, the mobile robot 100 may store the corresponding stop point information as a key node, and when constituting the SLAM map, the mobile robot 100 may store the stop point information as a temporary node.

The mobile robot 100 may be docked in the charging docking station 350 to charge the battery, and when receiving the lawn cutting command from the mobile terminal (operation S755), the mobile robot 100 may be re-localized to the stop point of the lawn cutting (operation S760).

The mobile robot 100 may change the toggle switch to the ON state (operation S740) to perform the lawn mowing work until a new event occurs.

The present disclosure described above may be embodied as computer-readable codes on a medium on which a program is recorded. The computer readable medium includes all types of recording devices in which data readable by a computer system readable may be stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the processor 190 of the mobile robot 100.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Therefore, the scope of the present disclosure should be defined not by the above-described embodiments but by the technical idea defined in the following claims.

What is claimed is:

1. A mobile robot, comprising:
   a transceiver;
   a main body;
   a weight sensing sensor configured to sense an external force applied to the main body;
   an obstacle sensing sensor configured to sense an obstacle approaching in a predetermined range;
   a storage;
   a blade disposed on a lower portion of the main body to cut lawn; and
   a processor configured
      to stop driving of the blade, when sensing an external force exceeding a predetermined intensity through the weight sensing sensor or sensing the obstacle in the predetermined range through the obstacle sensing sensor, in a middle of moving while driving the blade, and
      to stop a movement of the mobile robot,
   wherein the processor is configured to specify a position of the mobile robot in a work area based on information received through the transceiver, generate a spatial map corresponding to the work area, and update position information of the obstacle on the spatial map based on the specified position of the mobile robot and a sensing range of the obstacle sensing sensor,
   wherein the transceiver is configured to receive a wireless signal transmitted from three or more wireless communication anchors disposed in the work area of the mobile robot,
   wherein the processor is further configured to specify the position of the mobile robot on the work area based on an incident angle of the wireless signal when receiving the wireless signal through the transceiver, and
   wherein the processor is further configured to store information on a stop point of the lawn cutting in the storage, and move the mobile robot to a charging docking station disposed in a predetermined area of the work area.

2. The mobile robot of claim 1, wherein the processor is further configured to generate the spatial map corresponding to the work area according to the movement of the mobile robot in real time, based on the incident angle of the wireless signal received through the transceiver.

3. The mobile robot of claim 2, wherein the processor is further configured to:
   store, in the storage, temporary node information comprising at least one of position information of the mobile robot, sensing range information of the obstacle sensing sensor, or position information of the sensed obstacle, when the obstacle is sensed in the sensing range of the obstacle sensing sensor, while the spatial map corresponding to the work area is generated, and
   update the temporary node information on the generated spatial map when the spatial map has been generated.

4. The mobile robot of claim 2, wherein the processor is further configured to:
   store the generated spatial map in the storage; and
   update node information comprising at least one of position information of the mobile robot, sensing range information of the obstacle sensing sensor, or position information of the sensed obstacle on the spatial map stored in the storage when sensing the obstacle in the sensing range of the obstacle sensing sensor.

5. The mobile robot of claim 1, wherein the transceiver comprises three or more Angle Of Arrival (AOA) antennas, and
   wherein the processor is further configured to specify the position of the mobile robot on the work area based on the incident angle of the wireless signal when receiving the wireless signal through the AOA antennas.

6. The mobile robot of claim 1, further comprising a power supply,
   wherein the processor is further configured to
      charge power of the power supply when the mobile robot has been docked to the charging docking station, and
      request that the charging docking station transmits a message about the stop point of the lawn cutting to a mobile terminal through a transceiver provided in the charging docking station.

7. The mobile robot of claim 6, wherein the processor is further configured to move the mobile robot to the stop point of the lawn cutting stored in the storage when receiving a command to perform the lawn cutting from the mobile terminal through the charging docking station, and control the blade to perform the lawn cutting.

8. The mobile robot of claim 1, wherein the processor is further configured to transmit a message about the stop point of the lawn cutting to the mobile terminal through the transceiver, and control the blade to perform the lawn cutting when receiving a command to perform the lawn cutting through the transceiver from the mobile terminal.

9. The mobile robot of claim 1, wherein the processor is further configured to control the blade to perform the lawn cutting when the external force applied by exceeding the predetermined intensity to the main body is resolved.

10. The mobile robot of claim 1, wherein the processor is further configured to reset a movement route of the mobile robot to a direction different from a direction where the obstacle has been disposed when sensing the obstacle through the obstacle sensing sensor, and control the blade to perform the lawn cutting along the reset movement route.

11. The mobile robot of claim 1, wherein the processor is further configured to store, in the storage, information on an area where the lawn cutting has been performed in the work area, according to the movement of the mobile robot.

12. The mobile robot of claim 1, wherein the processor is further configured to:
set a toggle switch to an ON state or an OFF state,
drive the blade when the toggle switch is in the ON state, and
stop the driving of the blade when the toggle switch is in the OFF state.

13. A mobile robot comprising:
a transceiver;
a main body;
a weight sensing sensor configured to sense an external force applied to the main body;
an obstacle sensing sensor configured to sense an obstacle approaching in a predetermined range; an output interface;
a blade disposed on a lower portion of the main body to cut lawn; and
a processor configured to stop driving of the blade, when sensing an external force exceeding a predetermined intensity through the weight sensing sensor or sensing the obstacle in the predetermined range through the obstacle sensing sensor, in a middle of moving while driving the blade, and to stop a movement of the mobile robot,
wherein the processor is configured to specify a position of the mobile robot in a work area based on information received through the transceiver, generate a spatial map corresponding to the work area, and update position information of the obstacle on the spatial map based on the specified position of the mobile robot and a sensing range of the obstacle sensing sensor,
wherein the transceiver is configured to receive a wireless signal transmitted from three or more wireless communication anchors disposed in the work area of the mobile robot,
wherein the processor is further configured to specify the position of the mobile robot on the work area based on an incident angle of the wireless signal when receiving the wireless signal through the transceiver,
wherein the processor is further configured to reset a movement route of the mobile robot to a direction different from a direction where the obstacle has been disposed when sensing the obstacle through the obstacle sensing sensor, and control the blade to perform the lawn cutting along the reset movement route, and
wherein the processor is further configured to control the output interface to output at least one of laser light, an ultrasonic wave signal, or a warning sound toward the obstacle so that the obstacle moves when sensing the obstacle.

14. The mobile robot of claim 13, wherein the processor is further configured to
decide a point where the obstacle has been disposed as a fixed obstacle position point when the obstacle does not move during a predetermined time period, and
update the fixed obstacle position point on the spatial map.

* * * * *